(12) United States Patent
Pollard et al.

(10) Patent No.: US 11,499,917 B2
(45) Date of Patent: Nov. 15, 2022

(54) BIOMARKER DETECTION APPARATUS

(71) Applicant: Causeway Sensors Limited, Belfast (GB)

(72) Inventors: Robert Pollard, Bangor (GB); Antony Murphy, Belfast (GB); Breandan Hill, Belfast (GB); Danny O'Connor, Belfast (GB)

(73) Assignee: Causeway Sensors Limited, Belfast (GB)

( * ) Notice: Subject to any disclaimer, the term of this patent is extended or adjusted under 35 U.S.C. 154(b) by 255 days.

(21) Appl. No.: 16/270,843

(22) Filed: Feb. 8, 2019

(65) Prior Publication Data

US 2019/0250100 A1    Aug. 15, 2019

(30) Foreign Application Priority Data

Feb. 9, 2018  (GB) ...................... 1802151

(51) Int. Cl.
*G01N 21/21* (2006.01)
*G01N 21/552* (2014.01)
(Continued)

(52) U.S. Cl.
CPC ...... *G01N 21/554* (2013.01); *B01L 3/502715* (2013.01); *G01N 1/38* (2013.01);
(Continued)

(58) Field of Classification Search
CPC ........ G01N 21/03; G01N 21/554; G01N 1/38; G01N 1/4077; G01N 2001/4088;
(Continued)

(56) References Cited

U.S. PATENT DOCUMENTS

2006/0034729 A1* 2/2006 Poponin ............... G01N 21/658
422/82.05
2006/0192955 A1* 8/2006 Jorgenson ............ G01N 21/554
356/301
(Continued)

FOREIGN PATENT DOCUMENTS

GB    2545157 A    6/2017
WO   2008072156 A2   6/2008
(Continued)

OTHER PUBLICATIONS

Jiménez-Monroy, K. L. et al, (2017). High electronic Conductance Through Double-Helix DNA molecules with Fullerene Anchoring Groups. The Journal of Physical Chemistry A, 121(6), 1182-1188. https://doi.org/10.1021/acs.jpca.7b00348 (Year: 2017).*

(Continued)

*Primary Examiner* — Samuel P Siefke
*Assistant Examiner* — Tingchen Shi
(74) *Attorney, Agent, or Firm* — Christopher & Weisberg, P.A.

(57) ABSTRACT

An analyzing system is provided. The analyzing system includes a fluid container defining a sample chamber where a sample is contained in the sample chamber, and a sensor including a transparent body with a reverse face and an obverse face where the obverse face having a nanostructured surface. The nanostructured surface includes a plurality of elongate nanostructures having a respective longitudinal axis that is disposed substantially perpendicularly to the obverse face. The analyzing system includes an excitation and detection apparatus that includes an excitation source for generating a beam of polarized radiation and a corresponding radiation detector where the sensor is coupled to the fluid container such that the nanostructured surface is (Continued)

exposed to the sample chamber, to the sample located therein.

17 Claims, 3 Drawing Sheets

(51) Int. Cl.
  *B01L 3/00* (2006.01)
  *G01N 1/38* (2006.01)
  *G01N 1/40* (2006.01)
(52) U.S. Cl.
  CPC ........... *G01N 1/4077* (2013.01); *G01N 21/21* (2013.01); *B01L 2200/10* (2013.01); *B01L 2300/0654* (2013.01); *B01L 2300/0816* (2013.01); *B01L 2300/0819* (2013.01); *B01L 2300/0864* (2013.01); *B01L 2300/0867* (2013.01); *G01N 2001/4088* (2013.01); *G01N 2021/215* (2013.01); *G01N 2201/06113* (2013.01)
(58) Field of Classification Search
  CPC ............. G01N 2021/215; G01N 21/21; G01N 2201/06113; B01L 2200/10; B01L 2300/0654; B01L 2300/0816; B01L 2300/0819; B01L 2300/0864; B01L 2300/0867; B01L 3/502715
  See application file for complete search history.

(56) References Cited

U.S. PATENT DOCUMENTS

| 2018/0038820 A1* | 2/2018 | Merino | B01L 3/502761 |
| 2019/0285639 A1* | 9/2019 | Connolly | G01N 15/1434 |

FOREIGN PATENT DOCUMENTS

| WO | WO-2008086054 A2 * | 7/2008 | ........... G01N 21/554 |
| WO | 2010066727 A1 | 6/2010 | |
| WO | WO-2010066727 A1 * | 6/2010 | ....... G01N 33/54373 |
| WO | 2012161683 A1 | 11/2012 | |
| WO | WO-2016187588 A1 * | 11/2016 | ........... G01N 33/587 |
| WO | 2017060239 A2 | 4/2017 | |

OTHER PUBLICATIONS

Future Science. (Aug. 11, 2020). The secret life of proteins. BioTechniques. https://www.biotechniques.com/proteomics/the-secret-life-of-proteins/. (Year: 2019).*

UK Search Report dated Aug. 8, 2018, for corresponding Application No. GB1802151.9; Filing Date: Feb. 9, 2018 consisting of 1-page.

European Search Report dated Jun. 6, 2019, for corresponding European Application No. EP19156535, International Filing Date Feb. 11, 2019; consisting of 5-pages.

* cited by examiner

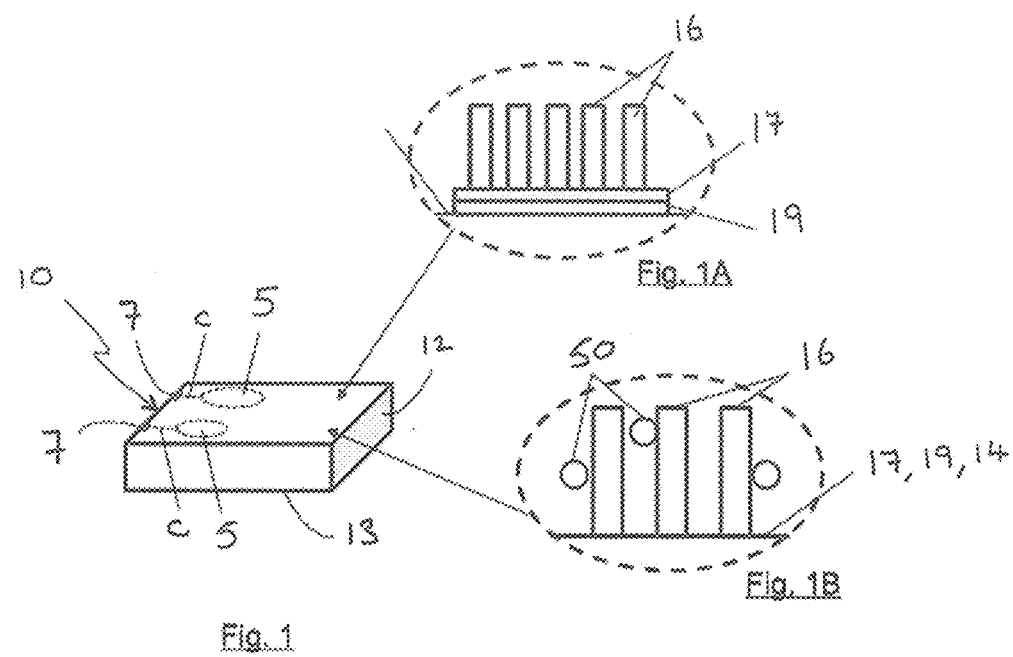
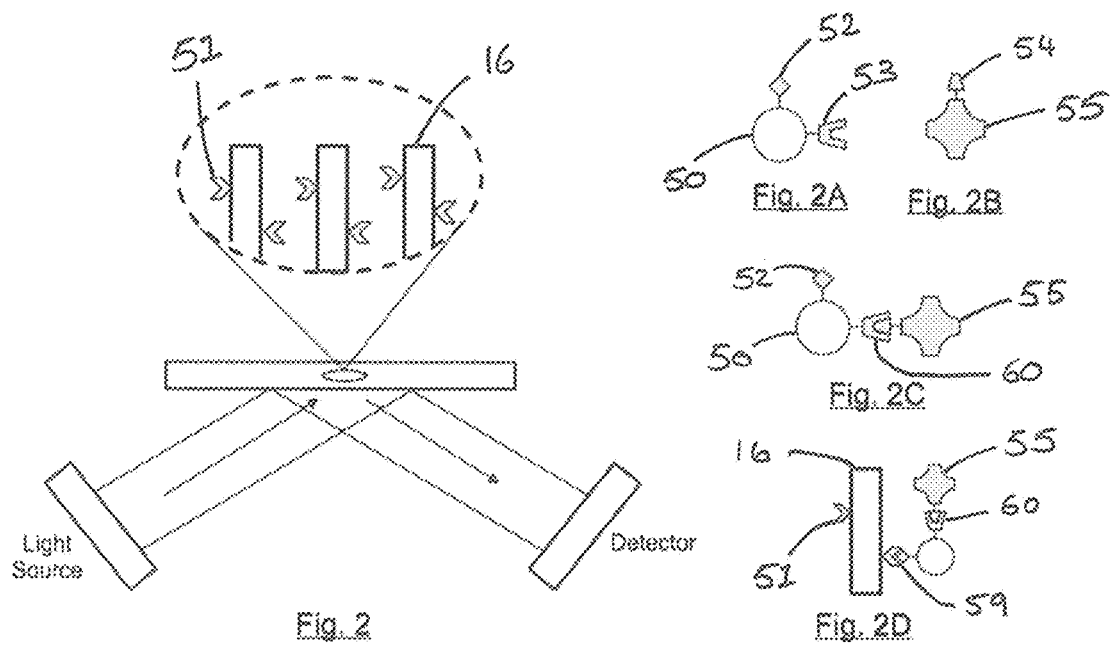

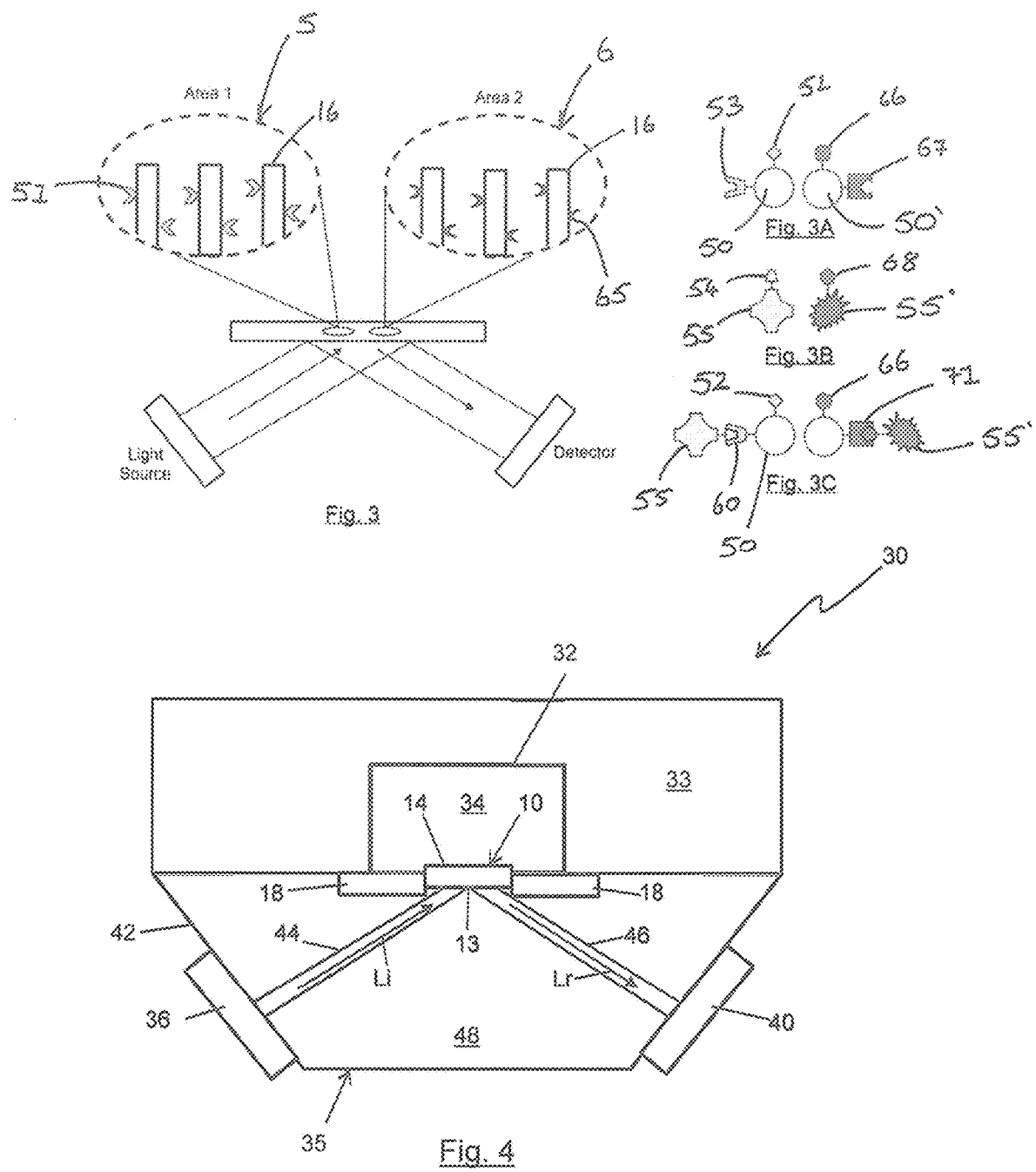

BIOMARKER DETECTION APPARATUS

CROSS-REFERENCE TO RELATED APPLICATION

This application is related to and claims priority to Great Britain Patent Application Number GB1802151.9, filed Feb. 9, 2018, the entirety of which is incorporated herein by reference.

FIELD

This invention relates to an analysing system for the detection of an analyte and in particular to an analysing system for the detection of a biomarker or pathogen.

BACKGROUND

Rapid detection of clinically relevant biomarkers and pathogens from biological samples is a critical step in the diagnosis of disease. This is true not only in health care diagnostics but in veterinary science, agri-food production and food safety. Traditional methods require several sequential steps from initial sample collection through to detection of the pathogen of interest. These steps can often require complex pre-analysis processing, enrichment or amplification steps in order to ensure adequate sensitivity to make the test fit for purpose followed by complex data interpretation. Multiple sample treatment steps can lead to a loss of sensitivity for the downstream detection method or introduces potential points of contamination thus bringing into question the validity of results. Furthermore, some automated techniques lack the relevant diagnostic sensitivity meaning that traditional microbiology techniques like total viable counts are still employed as the method of choice. This is a time consuming process often taking days to get a definitive result.

Within healthcare setting, three main workflows are used in the diagnostic algorithm. The first is culture based methods; they rely on an enrichment step and are generally used for bacterial pathogens. These tests are limited by how quickly the organisms in the sample grow in the enrichment media and are highly susceptible to contamination. The second method is molecular tests. Molecular biology requires a high level of operational expertise, significant infrastructure to limit cross contamination and expensive system and consumables to run the tests. These tests are much more expensive than culture based methods but offer a much higher level of sensitivity. The typical turnaround time for batch processing PCR is anywhere between 12-24 hrs. The third method is immunoassay based tests. These rely on the principal behind antibody-antigen reactions. Antibody-antigen reactions offer a highly specific mechanism for the detection of pathogens of interest. All immunoassay tests are based around this biological principal. The test relies upon the specificity of an antibody to an antigen on a particular pathogen of interest in a biological sample. This antibody (referred to as the primary antibody) binds to the pathogen via the specific antigen thus capturing the pathogen of interest in the biological sample. A second reaction is then carried out whereby a labelled antibody (referred to as the secondary antibody) binds specifically to the primary antibody. The secondary antibody is labelled with some form of reporter molecule. This molecule gives off a detectable signal. This signal can be light or color change of a substrate that can be measured by a detector system. Due to the multiple steps required to complete an immunoassay test, it can be time consuming or require expensive liquid handling system to screen samples for a range of biomarkers or pathogens furthermore, sensitivity is not comparable with PCR based methods.

More recently there has been a growing trend towards label free detection of biomarkers/pathogens of interest. Localized surface plasmon resonance (LSPR) is generated by nanoparticles or structures. These are typically gold or silver. LSPR produces a strong resonance absorbance peak in the visible light range of the spectrum. This absorbance peak is highly sensitive to refractive index changes close to the surface of the nanoparticle. One limitation in LSPR biosensors is the ability to detect minute quantities of small molecules. Since the detection relies on a refractive index change at the surface of the nanoparticle, a relatively high concentration of small molecules is required to induce this.

It is a desire of the present invention to overcome the above mentioned limitations with LSPR biosensors.

SUMMARY

A first aspect of the present invention provides an analyzing system comprising: a fluid container defining a sample chamber, wherein a sample is contained in the sample chamber; a sensor comprising a transparent body with a reverse face and an obverse face, the obverse face having a nanostructured surface, the nanostructured surface comprising a plurality of elongate nanostructures having a respective longitudinal axis that is disposed substantially perpendicularly to the obverse face; an excitation and detection apparatus comprising an excitation source for generating a beam of polarized radiation and a corresponding radiation detector, wherein, the sensor is coupled to the fluid container such that the nanostructured surface is exposed to the sample chamber, to the sample located therein; and wherein the excitation and detection apparatus is configured to direct a beam of incident polarized electromagnetic radiation onto the reverse face of the body at an angle that causes no or substantially no reflection of the polarized radiation from the reverse face, and wherein said excitation and detection apparatus is configured to direct to said detector a beam of reflected radiation, said beam of reflected radiation comprising said incident radiation emerging in use from the reverse face after reflection from said nanostructured surface; wherein the sample comprises a plurality of nanoentities and one or more analytes and wherein the nanoentities are operable to bind with the nanostructures and/or the one or more analytes.

Ideally, when the nanoentities are bound to both the nanostructures and the analyte simultaneously, the analyte being immobilised upon the nanostructured surface.

Preferably, the nanostructured surface comprises a plurality of spaced apart regions.

Ideally, at least a first region of the nanostructured surface is functionalised with a first member of a primary binding couple having an affinity for a second member of the primary binding couple which is functionalised upon at least some of the nanoentities.

Preferably, the nanoentities are further functionalised with a first member of a secondary binding couple having an affinity for a second member of the secondary binding couple which comprises at least one of the analytes contained within the sample.

Ideally, the analyte is functionalised with the second member of the secondary binding coupe.

Preferably, at least a second region of the nanostructures is functionalised with a first member of a tertiary binding couple having an affinity for a second member of the tertiary binding couple which is coated upon some of the nanoentities.

Ideally, the nanoentities which are functionalised with the second member of the tertiary binding couple are further functionalised with a first member of a quaternary binding couple which has an affinity for a second member of the quaternary binding couple which comprises at least one of the analytes contained within the sample.

Preferably, the analyte is functionalised with the second member of the quaternary binding couple.

Ideally, the binding couples comprise receptor-ligand binding couples.

Preferably, the first member of the primary and/or tertiary binding couples comprises an antibody and the second member of the primary binding couple comprises a complimentary antigen.

Ideally, the first member of the secondary and/or quaternary binding couple comprises an antibody and the second member comprises a complimentary antigen.

Preferably, the analyte comprises a pathogen.

Ideally, the pathogen comprises a virus, bacterium or fungus.

Preferably, the analyte comprises extracellular secreted proteins, human biomarkers, immunoglobulin or human cells.

Ideally, the nanoentities are formed from an electrically conductive material, typically a metallic material for example gold, aluminium, copper or any noble metal or any combinations of the aforesaid.

Preferably, the nanoentities are spherical in shape.

Ideally, the nanostructures and/or nanoentities and/or analyte are functionalised by being coated with the respective binding member or members.

Ideally, each of the plurality of regions are connected to a respective electrical terminal.

Preferably, respective different electrical bias may be applied to each of the regions by respective power supplies coupled to the electrical terminals.

Ideally, the respective nanostructures of each region are configured to resonate when illuminated by radiation at respective different wavelengths.

Preferably, the respective nanostructures of each region are configured to resonate at a respective wavelength that corresponds to a respective wavelength of the radiation produced by said excitation source.

Ideally, the excitation source is operable to produce radiation at more than one wavelength, and wherein said nanostructured surface includes at least one of said nanostructured region for each of said wavelengths in which the respective nanostructures are configured to resonate when illuminated by the radiation at the respective wavelength.

A second aspect of the invention provides a microfluidic chip comprising the analyzing system of the first aspect of the invention.

Preferably, the analyzing system of the first aspect of the invention is provided in a biochip which is coupled to or mounted upon the microfluidic chip.

Ideally, the microfluidic chip, further comprising an initial sample receiving chamber which is operable to receive the sample containing the one or more analyte.

Preferably, the microfluidic chip, further comprising an injection chamber which contains the plurality of nanoentities, which is operable to inject the nanoentities into the sample.

Ideally, wherein the sample receiving chamber and injection are fluidly coupled to a mixing chamber, wherein the sample is mixed with the nanoentities.

Preferably, the mixing chamber is coupled to a separation chamber which is configured to separate the one or more analytes contained within the sample.

Ideally, the separation chamber comprises a centrifuge or filter.

Preferably, the separation chamber is fluidically coupled to the biochip by one or more microfluidic flow channels.

Ideally, different regions of the sensor are configured to bind with particular analytes contained within the sample.

A third aspect of the invention provides a method of analyzing a sample using a sensor comprising a transparent body with a reverse face and an obverse face, the obverse face having a nanostructured surface, the nanostructured surface comprising a plurality of elongate nanostructures having a respective longitudinal axis that is disposed substantially perpendicularly to the obverse face, the method comprising: exposing the nanostructured surface to the sample comprising a plurality of nanoentities and one or more analytes; causing the nanoentities to bind with the nanostructures and/or the one or more analytes; directing a beam of incident polarized electromagnetic radiation onto the reverse face of the body at an angle that causes no or substantially no reflection of the polarized radiation from the reverse face; and directing to a detector a beam of reflected radiation, said beam of reflected radiation comprising said incident radiation that emerges from the reverse face after reflection from said nanostructured surface.

BRIEF DESCRIPTION OF THE DRAWINGS

An embodiment of the invention is now described by way of example with reference to the accompanying drawings in which like numerals are used to denote like parts and in which:

FIG. 1 is a perspective view of a nanostructured plasmonic sensor for use in an analyzing system embodying the invention;

FIG. 1A is a detail view of the nanostructured surface of the plasmonic sensor of FIG. 1;

FIG. 1B is a detail of the nanostructured surface of FIG. 1 in particular showing a plurality of nanoentities adjacent thereto;

FIG. 2 is a schematic view of an analyzing system embodying one aspect of the invention, the apparatus including the plasmonic sensor of FIG. 1 whereby a region of the nanostructured surface is coated in a first member of a first binding couple;

FIG. 2A is a schematic view of a nanoentity, in this case a nanosphere, which is coated in a second member of the first binding couple and a first member of a second binding couple;

FIG. 2B is a schematic view of an analyte, in this case a pathogen, which comprises the second member of the second binding couple;

FIG. 2C is a schematic view showing the binding of the analyte and nanoentity, in particular showing a nanoentity and analyte complex formed by the binding of the first and second members of the second binding couple;

FIG. 2D is a schematic view of the nanostructured surface of the plasmonic sensor of FIG. 1 showing the analyte immobilized on the nanostructured surface by the binding of analyte to the nanoentity via the second binding couple and the binding of the nanoentity to the nanostructured surface by the first binding couple;

FIG. 3 is a schematic diagram of an alternative embodiment of the invention showing an excitation apparatus directing a beam of polarized radiation at the plasmonic sensor and a corresponding detection apparatus, in particular showing first and second regions of the nanostructured surface with each region being coated in a different first member of a respective binding couple;

FIG. 3A is a schematic diagram of two nanoentities with the nanoentities being coated in respective first and second members of first and second binding couples such that the two nanoentities are operable to immobilize different analytes upon the first and second regions of the nanostructured surface as shown in FIG. 3;

FIG. 3B is a schematic diagram showing two different analytes with each analyte comprising different binding members for binding to the differently functionalized nanoentities of FIG. 3A;

FIG. 3C is a schematic diagram showing the binding of the different analytes to the two nanoentities by the interaction of the different binding members of the binding couples;

FIG. 4 is a schematic view of an analyzing system embodying one aspect of the invention, the system including the plasmonic sensor of FIG. 1 and in particular showing a fluid container a defining a sample chamber for containing a sample to be analyzed;

DETAILED DESCRIPTION

Figure 5:
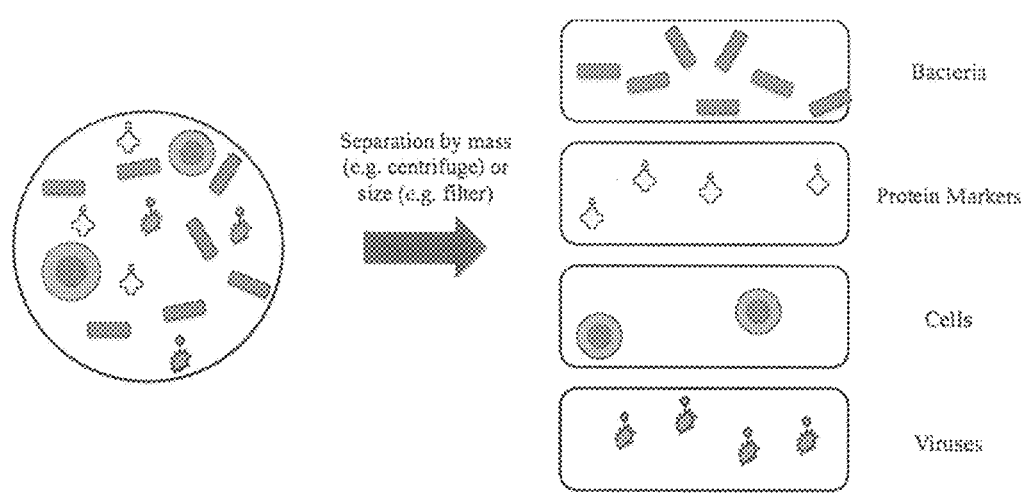
FIG. 5 is a diagram showing the separation of a high level biological sample comprising multiple analytes by mass or size into discrete pathogen lines e.g. bacteria, proteins, cells and viruses.

Referring now to FIG. 1 of the drawings there is shown, generally indicated as 10, a nanostructured plasmonic sensor. The sensor 10 comprises a body 12 with a reverse face 13 and an obverse face 14, the obverse face 14 having a nanostructured surface. A nanostructured surface is a surface on which there is formed a plurality of nanostructures. A nanostructure is a structure that has at least one dimension on the nanoscale. For the purposes of the present invention, nanoscale means between 0.1 nm and 1000 nm, more typically between 1 nm and 200 nm. A nanostructure may have only one dimension on the nanoscale, or two dimensions on the nanoscale, or three dimensions on the nanoscale. Nanostructures having three dimensions on the nanoscale are referred to as nanoparticles.

FIG. 1A shows a more detailed view of the nanostructured surface of the obverse face 14. The nanostructured surface comprises a plurality of nanostructures 16 that are preferably elongate, having a respective longitudinal axis that is disposed substantially perpendicularly to the obverse face 14. The nanostructures 16 are therefore substantially parallel with each other. In preferred embodiments, the nanostructures 16 are spaced apart from one another, e.g. each nanostructure 16 is spaced apart from the, or each, adjacent nanostructure 16. Alternatively, at least some and optionally all of the nanostructures 16 are contiguous with the, or each, adjacent nanostructure 16. The nanostructures 16 may be arranged in a one or two dimensional array, preferably being aligned with each other along the, or each, dimension of the array. Advantageously, the aspect ratio of the length L to the width W of each nanostructure 16 is greater than 1. The third dimension (not illustrated) of the nanostructures 16 may be of any desired size depending on the application, for example it may be similar to the width W or the length L, or may be unlimited, e.g. the nanostructures may form a grating. In preferred embodiments, at least some and preferably all of the nanostructures 16 are nanoparticles, having three dimensions on the nanoscale.

For example, some or all of the nanostructures 16 may comprise a rod, wire or a tube, in particular a nanorod, nanowire or nanotube, which may take any suitable shape for example substantially cylindrical or substantially conical. The nanostructures 16 may be solid or hollow.

The nanostructures 16 are typically formed from an electrically conductive material, typically a metallic material, for example, any of silver, gold, aluminum, platinum, copper or any noble metal or any combinations of the aforesaid. In typical embodiments, the width W of the nanostructures 16 is approximately 2 nm to approximately 500 nm, usually approximately 10 nm to approximately 100 nm, and the length L of the nanostructures 16 is approximately 10 nm to approximately 2000 nm, usually approximately 50 nm to approximately 500 nm. For example, the nanostructures 16 may have a width of approximately 20 nm and a length of approximately 500 nm. It is preferred that the nanostructures 16 are substantially uniform in width and/or height although this need not necessarily be the case.

Typically, the spacing between adjacent nanostructures 16 is approximately 2 nm to approximately 1500 nm, usually approximately 20 nm to approximately 500 nm. In preferred embodiments, the nanostructures 16 are spaced apart from one another by a distance less than the wavelength of the excitation light used to cause plasmonic oscillations, as is described in further detail below. The nanoparticle to nanoparticle separation may be periodic, at a scale of approximately 20 nm to approximately 1500 nm. The nanoparticle to nanoparticle separation may be quasi-periodic, at a scale of approximately 20 nm to approximately 1500 nm. Typically, the sensor 10 includes in the order of one billion nanoparticles 16.

The body 12 provides a mechanical support for the nanostructures 16. The body 12 may be made of any convenient material, preferably a dielectric material, for example glass, crystal or plastics. Typically, the body 12 is substantially planar in shape, having spaced apart, oppositely disposed obverse and reverse faces 13, 14 that are preferably parallel with one another. By way of example, the body 12 may be between approximately 0.3 to approximately 2 mm thick (i.e. between faces 13, 14. The body 12 is made from material that is transparent to the electromagnetic radiation (usually light radiation) that is used to illuminate the sensor 10, as is described in more detail below. In the case where the illuminating radiation is light, the body 12 may for example be formed from glass.

In typical embodiments, the nanostructures 16 are formed on a layer 17 of electrically conductive material, typically a metallic layer, provided at the obverse face 4 of the body 12, i.e. as part of a nanostructured metallic layer on the body 12. Any conventional fabrication technique that is suitable for forming a nanostructured metallic layer may be used for this purpose. For example, the nanostructures may be formed by electrodeposition, optionally in pores formed in a layer of insulating material, e.g. aluminum oxide. Typically, an adhesive layer 19 is provided between the body 20 and the metallic layer 17. Any conventional adhesive layer material may be used, e.g. titanium or tantalum, and is typically formed by physical vapor deposition. In alternative embodiments, the layers 17, 19 may be omitted and the nanostructures may be provided on the body by any other means, e.g.

by dispersion of a liquid with a dispersion of nanostructures and subsequent evaporation of the liquid.

To facilitate incorporating the sensor 10 into an analyzing apparatus, the sensor 10 may be mounted on a carrier 18 that exposes the reverse face 13 to allow the radiation to impinge upon and emerge from the reverse face as described herein, and exposes the obverse face to the sample chamber. The carrier 18 may be formed form any convenient material, e.g. plastics. The preferred carrier 18 is illustrated in and comprises a body in which a through-aperture 21 is formed, the sensor 10 being mounted in the aperture 21 such that its faces 13, 14 are exposed. The body may for example comprise a substantially planar body and may be in the order of 1 mm thick.

As can be seen in FIG. 1 the nanostructured surface of the sensor 10, typically formed on the obverse face 14 thereof, may comprise a plurality of distinct regions 5, 6 with each region comprising a plurality of nanostructures. Preferably the nanostructured surface comprises at least two regions 5, 6. The regions 5, 6 may be spaced apart from one other upon the observe face 14 to further distinguish them with respect to one another or alternatively the regions 5, 6 may be continuously arranged with respect to one another. Each of the regions 5, 6 may have different characteristics relative to one another. For example each region 5, 6 may be connected to a respective electrical terminal 7, to which respective electrical power supplies may be connected such that respective different electrical bias may be applied to each of the regions 5, 6. Alternatively each of the regions 5, 6 may be connected to the same electrical terminal 7 such that the same electrical bias is applied to each region. Additionally or alternatively the regions 5, 6 may be functionalized with different binding members of respective binding pairs.

Referring now to FIG. 4, there is shown an analyzing system 30 comprising a fluid container 32 or reaction vessel, e.g. a cuvette, defining a sample chamber 34 for containing a sample, e.g. an assay sample, to be analyzed. In an alternative embodiment the fluid container 32 may comprise a microfluidic flow channel. Typically the sample is a liquid or fluid that includes an analyte such as chemical or biological material. Additionally the sample preferably comprises a plurality of nanoentities 50. The sensor 10 is coupled to the fluid container 32 (via the carrier 18 in this example) such that the obverse face 14 and in particular the nanostructured surface is exposed to the chamber 34, i.e. exposed to and typically immersed in the sample during use. Preferably, there is direct contact between the nanostructured surface of the sensor 10 and the sample, in particular the nanoentities 50, during use. To his end the nanoentities 50 are configured to bind to the nanostructures 16 on the nanostructured surface.

FIG. 1B shows a detailed view of the nanostructured surface of the sensor 10 and in particular shows the plurality of nanoentities 50 located adjacent to the nanostructures 16. The nanoentities 50 may comprise any suitable shape however, preferably, as is shown in the figures the nanoentities may be spherical in shape. The nanoentities 50 are preferably formed from an electrically conductive material, typically a metallic material, for example, any of silver, gold, aluminum, platinum, copper or any noble metal or any combinations of the aforesaid. The nanoentities 50 may be 1 nm to 100 nm in diameter. A seal (not shown), such as an 0-ring, is typically provided between the sensor 10 and the fluid container 32 to keep the sample within the chamber 34. The reverse face 13 of the sensor 10 is exposed to allow excitation radiation to be directed onto the reverse face 13 of the sensor 10, thereby reaching the nanostructures 16 through the body 12, and to allow radiation reflected from the nanostructures 16 to emerge out of the body 12 through the reverse face 13.

The analysis apparatus 30 includes an excitation and detection apparatus 35 configured to direct a beam of incident radiation Li, e.g. a beam of light in preferred embodiments, from an excitation source 36 to the sensor 10, and in particular to the reverse face 13 of the body 12, and to direct a beam of reflected radiation Lr, e.g. a beam of reflected light in preferred embodiments, from the sensor 10, and in particular radiation emerging from the sensor 10 through the reverse face 13 to a detector 40.

Conveniently, the container 32 is received in a cuvette block 33 which can be releasably secured to the excitation and detection apparatus 35, for example by one or more clamps (not shown). The carrier 18 may be fixed to the block 33 by any convenient means, e.g. adhesive, or under the action of the clamps. In use, the sensor 10 is positioned between the block 33 and the excitation and detection apparatus 35.

The excitation source 36 generates a beam of electromagnetic radiation. In typical embodiments the 40 excitation source 36 is of a type that generates light, especially visible light but more generally light having a wavelength typically between approximately 300 nm to 1500 nm.

More particularly, the preferred excitation source 36 is of a type that generates polarized light, preferably p-polarized light, also known as transverse-magnetic light. P-polarized light is linearly polarized light with polarization direction lying in the plane of incidence. The plane of incidence is the plane which contains the surface normal and the propagation vector of the incoming light radiation. Polarized light with its electric field along the plane of incidence is thus denoted p-polarized. P polarized radiation is commonly referred to as transverse-magnetic (TM) radiation. By way of example a stand LED light source with a polarizing filter may be used as the light source 36. The respective nanostructures 16 of the regions 5, 6 of the sensor 10 may be configured to resonate when illuminated by radiation as respective different wavelengths. Furthermore the nanostructures of each region 5, 6 may be configured to resonate at a respective wavelength that corresponds to a respective wavelength of the radiation produced by the excitation source 36. To this end the excitation source 36 is operable to produce radiation at more than one wavelength, preferably the nanostructured surface of the sensor 10 comprises at least one nanostructured region 5, 6 for each of the wavelengths at which the respective nanostructures are configured to resonate when illuminate by the radiation of the excitation source 36 at the respective wavelengths.

The detector 40 detects electromagnetic radiation that is reflected from the sensor 10. The detector 40 is of a type that is compatible with the excitation source 36 and so, in typical embodiments, comprises a light detector. e.g. a photodetector such as the Thorlabs PDA 100 (trade mark).

In preferred embodiments, the excitation and detection apparatus 35 includes a light guide 42 configured to direct the incident and reflected beams Li, Lr to and from the sensor 10. The preferred light guide 42 includes an excitation channel 44 for directing the incident radiation to the sensor 10. The channel 44, which is typically linear, extends from the excitation source 36 to the exposed reverse face 13 of the body 12. The light guide 42 preferably includes a detection channel 46 for directing the reflected radiation to the detector 40. The detection channel 46, which is typically linear, extends from the exposed reverse face 13 of the body 12 to the detector 40. Optionally, the channels 44, 46 contact the reverse face 13 at a respective separate part of the reverse face 13.

In alternative embodiments, the light guide 42 and channels 44, 46 may be omitted. In such cases, the excitation and detection apparatus may for example comprise the excitation source, the detector and means for focusing and/or collimating one or both of the radiation beams, e.g. one or more lenses, and/or the excitation source may be of a type that generates a focused beam, e.g. a laser. For example the excitation and detection apparatus may comprise a hollow block on which the excitation source and detector are mounted and positioned to direct light to and receive light from the sensor through the hollow interior of the block. Optionally, one or more focusing and/or collimating lenses may be provided at the excitation source and/or at the detector. Optionally, a non-reflective coating may be applied to the interior of the block.

In the illustrated embodiment, the light guide 42 has a solid body 48 in which the channels 44, 46 are formed by any conventional means, e.g. drilling or molding. In alternative embodiments, the body 48 need not be solid. For example it may comprise a frame holding one or more tubes which define the, or each channel 44, 46. In any event, the walls forming the channels 44, 46 are typically opaque to the radiation although this is not essential depending on how the radiation is carried through the channels 44, 46. For example, the radiation may propagate directly through the, or each, channel 44, 46 in which case the channel walls should be opaque. Alternatively, the radiation may propagate through a light guide, e.g. a fiber optic cable, which is located in the respective channel 44, 46, in which case the channel walls need not be opaque. Optionally, a non-reflective coating may be applied to the interior surface of the channels.

In preferred embodiments, the excitation and detection apparatus 35 is configured so that the excitation radiation Li is incident on the reverse face 13 of the body 12 at an angle e1, measured with respect to the surface normal, that is equal to or substantially equal to the Brewster angle (also known as Brewster's angle or the polarization angle). The Brewster angle is the angle of incidence at which light with a particular polarization, in this case p-polarization, is perfectly transmitted through the surface, in this case the reverse face 13 of the body 12, of a transparent medium when passing from a first medium to a second medium which have different refractive indices, with no reflection from the surface. In this example, the first medium is that of the channel 44 and is typically air, while the second medium is that of the body 12, which is typically glass. The Brewster angle for an air/glass interface is approximately 57° (where the glass has a refractive index of 1.52). It will be understood that the Brewster angle may be different for different media that may be used in alternative embodiments of the invention, including glass having a different refractive index than 1.52.

Hence, in the preferred embodiment, the channel 44 is angled with respect to the reverse face 13 such that the radiation beam Li is incident on the reverse face 13 at or substantially at the Brewster angle, thereby eliminating or substantially eliminating reflections from the reverse face 13. In embodiments where the light guide is omitted, the radiation may be directed by other means as indicated above, but still passes through a medium, typically air, as it travels from the excitation source to the reverse face of the sensor, and from the sensor to the detector. In such cases, the medium is contained within the excitation and detection apparatus 35, e.g. in one or more chambers through which the radiation travels.

In use, when the excitation beam Li hits the reverse face 13, it is refracted by the body 12. Hence, the angle of incidence e2 of the excitation beam Li at the obverse face 14 of the body 12 (with respect to the normal of those surfaces) is less than the angle of incidence e1 of the beam Li at the reverse face 13 (with respect to the normal) of the substrate 18. Advantageously, the arrangement is such that e2 is less than the angle required to achieve attenuated total reflection (ATR) within the body 12. Typically, the body 12 is made of a material (e.g. glass) having a higher refractive index than the medium (e.g. air) through which the light is propagated to reach the body 12.

In use, plasmonic oscillations, which may also be referred to as plasmonic resonance, are caused in the nanostructured surface 14 of the sensor 10 in response to radiation beam Li incident at the reverse of the nanostructured face 14 of the sensor, advantageously at an angle of incidence below that required for ATR. Plasmonic oscillations occur in the nanostructured surface in a direction that is normal to the obverse face 14. More generally, the plasmonic oscillations occur in directions that are possible to be excited by the radiation. In the preferred embodiments where the nanostructures 16 are elongate, plasmonic oscillations occur both along and transverse to the longitudinal axis of the nanostructures 16. The plasmonic oscillations along the longitudinal axis resonances are in this case used for sensing, which requires a component of the excitation light to be at non-normal incidence on the reverse face 13.

In preferred embodiments, ATR is not possible at face 14 because face 13 is parallel to it. For ATR to occur, a prism (not shown) would have to be used instead of the preferred slide. Accordingly, in preferred embodiments, plasmons can be excited in the nanostructured surface 14 with the excitation incident at any angle without getting to an ATR angle. The only incidence angle that gives low reflection from parallel face 13 is the Brewster angle.

Advantageously the incident radiation impinges on the face 13 at the Brewster angle to eliminate or substantially eliminate reflections from the face 13. The incident radiation Li subsequently impinges on the reverse of the nanostructured surface 14, and is reflected by the reverse face of the nanostructured surface 14 whereupon it travels back through the body 12, emerging from the reverse face 13 and being directed to the detector 40 as the reflected radiation beam Lr. Advantageously, there is no ATR of the beams Li, Lr within the body 12. In preferred embodiments, the reflected beam Lr is directed from the body 12 to the detector 40 by the channel 46 (either directly by the channel 46 or by a light guide (not shown) located in the channel 46).

The plasmonic oscillations in the nanostructured surface 14 of the sensor 10 interact with the sample in the chamber 34 and, depending on what is contained in the sample, these interactions affect one or more characteristics of the reflected beam Lr, for example its intensity. For example, changes in the intensity (e.g. a modulation of intensity) can be caused by an alteration of the resonance conditions of the nanostructures 16. Hence, by analyzing one or more characteristics of the reflected beam Lr, the detector 40 can determine one or more characteristics of the sample, e.g. relating to its composition. Any suitable conventional analysis may be used for this purpose. The detector 40 may comprise a photodiode or CCD camera.

It will be seen that in preferred embodiments, plasmonic oscillations in the sensor 10 are caused by an excitation beam Li incident on the reverse face nanostructured surface 14. The Brewster angle is not used to get minimum reflectivity at the reverse face nanostructure surface 14; instead preferred embodiments use the Brewster angle for p-polarized radiation to minimize unwanted reflection from the reverse face 13 of the body 12. This is possible because the nanostructured surface 14 of the sensor 10 can generate plasmonic oscillations when excited at an angle less than required for ATR. This makes the apparatus 30 simpler and cheaper in comparison with known alternatives that use ATR prisms to create ATR of the light to excite surface plasmons in a gold or silver planar film.

To enhance the detection of one or more analytes 55 contained with the sample, the sample which is typically contained within a reaction vessel such as the sample chamber 34, preferably comprises the plurality of nanoentities 50. The nanoentities 50 are configured to bind with both the analytes 55 and/or the nanostructures 16 such that the analytes 55 may be immobilized upon the nanostructured surface when the nanoentities 50 are simultaneously bound to both the analytes 55 and the nanostructures 16. The nanoentities 50 are configured to bind to both the nanostructures 16 and the analytes 55 by respective binding couples, wherein each binding couple comprises a first member which has a binding affinity for a second member and vice versa. The first and second members of the binding couples ideally comprise complimentary receptors and ligands such as an antibody and a corresponding antigen such that the binding couple when bound forms an antibody-antigen conjugation. The nanostructures 16 of the nanostructured surface may be functionalized i.e. by coating other any other suitable means including standard biological protocol, with a first member of a binding couple which is operable to bind with a second member of the binding couple located upon the nanoentities 50. Typically the nanoentities 50 may be functionalized i.e. by coating or any other suitable means, with at least an antibody which is co-operable with the antigen of a specific analyte. Advantageously the binding of the nanoentities 50 to the nanostructured surface disrupts the plasmonic resonance excited upon the nanostructured surface resulting in a detectable change in optical reflection of the reflected beam Lr which may be measured by the detector 40 to indicate the presence and/or concentration of one or more analytes 55.

To this end at least part of the nanostructured surface, typically at least the first region 5 of the nanostructured surface of the sensor 10, is coated with a first member 51 of a primary binding couple 59 (as shown in FIG. 2) having an affinity for a second member 52 of the primary binding couple 59 which is coated upon at least some of the nanoentities 50 (see FIG. 2A). Consequently the nanoentities 50 are therefore operable to bind to the nanostructured surface by the binding of the primary binding couple 59. The nanoentities 50 may be further coated with a first member 53 of a secondary binding couple 60 having an affinity for a second member 54 of the secondary binding couple 60 which comprises at least one of the analytes 55 contained within the sample. As a result of the primary and secondary binding couples 59, 60 the analytes 55 contained within the sample may be immobilized upon the nanostructured surface.

The primary and secondary binding couples 59, 60 ideally comprise complimentary receptor and ligands. In a preferred embodiment, as shown in FIGS. 2 to 2D, the nanostructures 16 are coated in the first member 51 of the primary binding couple 59 which comprises a receptor such as an antibody. Referring now to FIG. 2A, the nanoentity 50 shown coated in the second member 52 of the primary binding couple 59, which in this case comprises a ligand such as an antigen, which is complementary to the receptor located on the nanostructures 16. Alternatively, the first and second members 51, 52 of the primary binding couple 59 may be reversed such that the ligand is located upon the nanostructures 16 and the receptors are located upon the nanoentities 50. Further as is shown in FIG. 2A the nanoentity 50 is additionally coated in the first member 53 of the secondary binding couple 60 which in this case comprises a receptor such as an antibody, which is complimentary to the second member 54 of the secondary binding couple 60. A first variation of analyte 55, shown in FIG. 2B, comprises the second member 54 of the secondary binding couple 60 which typically comprises a ligand, in this case an antigen, which is operable to bind to the receptor, comprising an antibody, located upon the nanoentity 50, as is shown in FIG. 2C, to form a nanoentity-analyte complex through conjugation. When the nanoentity 50 is bound to both the analyte 55, the nanostructures 16 by the primary and secondary binding couples 59, 60, the analyte 55 is immobilized on the nanostructured surface as is shown in FIG. 2D.

Additionally the second region 6 of the nanostructured surface of the sensor 10 may be coated in a first member 65 of a tertiary binding couple (shown in FIG. 3) which is operable to bind with a second member 66 of the tertiary binding couple which may be coated upon some of the nanoentities 50' contained within the sample. Further these same nanoentities 50' may be coated in a first member 67 of a quaternary binding couple 71 which has a binding affinity for a second member 68 of the quaternary binding couple 71 which is located upon a second variation of analyte 55'. To this end, as is shown in FIGS. 3 to 3C, the first member 65 of the tertiary binding couple preferably comprises a receptor, in particular an antibody whilst the second member 66 ideally comprises a complimentary ligand, in particular an antigen. Further the first member 67 of the quaternary binding couple 71 typically comprises a receptor, in particular an antibody whilst the second member 68 of the quaternary binding couple 71 preferably comprises a complimentary ligand, in particular an antigen.

It should be understood that further regions (not shown) of the nanostructured surface, other nanoentities 50, 50' located within the sample, may be coated in additional binding members (not shown) such that further variations of analytes 55, 55' contained within the sample may be immobilized upon the nanostructured surface of the sensor 10 in the manner recited above. Additionally one or more regions of the nanostructured surface may be functionalized, typically by coating with at least one binding member which is complimentary to a binding member of one or more of the analytes 55, 55' contained within the sample such that the analyte(s) 55, 55' may be directly immobilized upon the nanostructured surface. For example the nanostructured surface may be coated with an antibody which is complimentary with an antigen of a pathogen contained within the sample, such that the pathogen may be immobilized on the nanostructured surface.

The binding between the nanoentities 50, 50' and the nanostructures 16, such as the primary and tertiary binding couples 59, 70, may be affected by a peptide binder or aptamer that has an affinity for the antigen located on the analyte 55. In an alternative embodiment the binding between the first and second members of the secondary binding couple 60 and the first and second members of the tertiary binding couple 70 may be affected by a mixture of antibody/peptide binders and/or aptamers which are operable to interact with a range of antigens on the analytes 55, 55'. Additionally the binding between, the nanoentities 50, 50' and the analytes 55, 55', in particular the binding of the secondary and quaternary binding couples 60, 71, may be affected by a peptide binder or aptamer that has an affinity for the antigen located on the analyte 55. In an alternative embodiment the binding between the first and second members 53, 54 of secondary binding couple 60, or first and second members of the quaternary binding couples may be affected by a mixture of antibody/peptide binders and/or aptamers which are operable to interact with a range of antigens on the analyte 55.

The analyte 55, 55' typically comprises biological material, for example the analyte may comprise a pathogen such as a virus, bacterium or fungus. Alternatively the analyte may comprise a biological element which is secreted or otherwise produced from a cell for example outer membrane vesicles secreted by Gram negative bacteria. Further the analytes 55 may comprise extracellular secreted proteins, human biomarkers, immunoglobulin or human cells.

For each of the embodiments described it is preferable that that the quantity of nanoentities 50, 50' which are mixed with the sample is known prior to their introduction into the sample. Additionally or alternatively, prior to the sample being introduced into the sample chamber 34, the sample may undergo separation such that only the particular analytes 55, 55' of which it is desired to measure the concentration of, are introduced into the sample chamber 34 with other elements of the sample being removed. In such an embodiment the sample may be mixed with a plurality of nanoentities 50, 50' which are configured to bind with the particular analytes 55, 55'. Preferably, for each embodiment described, upon binding of the nanoentities 50, 50' with the analytes 55, 55' to form binding couples, the sample may then undergo separation to remove the binding couples from the unbound nanoentities 50, 50' and analytes 55, 55'. The binding couples of the nanoentities 50, 50' and the analyte 55, 55' may be separated from the sample by mass or size using a centrifuge or a filter respectively. The use of a filter to separate the binding couples from the sample is illustrated in FIG. 5. Subsequently this solution of binding couples may then be introduced into the sample chamber 34 for analysis. The analysis may include obtaining measurements of the reflection characteristics of the nanostructured surface when the nanoentity-analyte binding couples are immobilized, by binding, upon the nanostructured surface, these measurements may then be compared with measurements obtained when a known quantity of nanoentities 50, 50' are bound to the nanostructured surface. For example the known quantity may comprise at least one nanoentity 50, 50' bound to the nanostructured surface or more preferably the known quantity may comprise the total quantity of nanoentities 50, 50' which were introduced to the sample prior to separation. By comparing the measurement obtained when the nanoentity-analyte binding couples are bound to the nanostructured surface to the measurement obtained by a known quantity of nanoentities 50, 50' are bound to the nanostructured surface a ratio can be calculated which allows for the concentration of analyte to be determined.

In an alternative embodiment the unbound nanoentities 50, 50' may be separated from the sample to leave the binding couples therein. The unbound nanoentities 50, 50', may then be re-suspended in a fresh buffer and introduced into the sample chamber 34 such as to interact with the nanostructured surface of the sensor 10 to give a detectable signal. Wherein the measurements obtained when the unbound nanoentities 50, 50' are immobilized upon, typically by binding, the nanostructured surface are compared to measurements obtained when the known quantity of nanoentities 50, 50' are immobilized thereupon such that a ratio can be obtained to determine the concentration of analytes 55, 55' which were bound to the nanoentities 50, 50' in the sample.

In one embodiment, the nanoentities 50, 50' that are bound to the analytes 55, 55' undergo chemical detachment from the nanostructured surface. These are then re-suspended in a buffer and interact with the nanostructured chip surface to give a detectable change in the reflection characteristics of the nanostructured surface. The detached analyte 55, 55' may then be separated therefrom to be used for further downstream analysis.

In one embodiment, the biological sample undergoes cell lysis. The lytic reaction liberates nucleic acid from cells and virus particles in the biological sample. The nucleic acid is separated from the cell debris and re-suspended in fresh buffer along with functionalized nanoentities 50. Nanoentities are functionalized with single stranded nucleic acid sequences. These sequences are complementary to sequences of interest in the nucleic acid sample. The sample/nanoentity mixture is incubated to promote formation of nanoentity/nucleic acid complexes through binding of probes to complementary sequences in sample. The nanoentity/nucleic acid complex is then separated from the biological sample and unbound nanoentities.

In one embodiment, the detection on the nanostructure chip surface will be through a mixture of nanoentity 50, 50'-analyte 55, 55' binding couples and analyte only bindings with the nanostructured chip surface.

Figure 6:
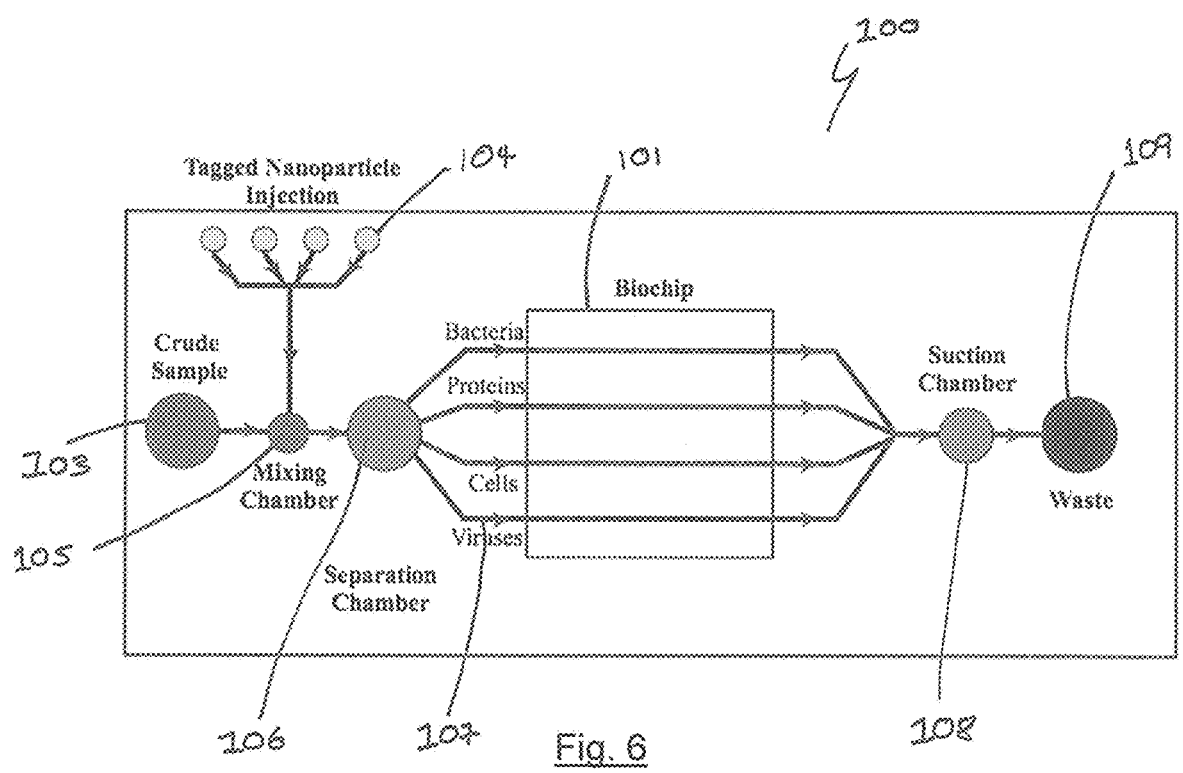
FIG. 6 is a schematic diagram showing a microfluidic chip including a biochip comprising the analyzing system of FIG. 4.

A further aspect of the invention provides a biochip 101 comprising the analyzing system 30 which may be incorporated within a microfluidic chip which is generally indicated by the reference numeral 100 as shown in FIG. 6. In this embodiment the reaction vessel may comprise a microfluidic flow channel. The microfluidic chip 100 typically comprises an initial sample receiving chamber 103 which is operable to receive the sample containing the analyte 55, 55'. The microfluidic chip 100 additionally comprises one or more injection chambers 104, which may contain the plurality of nanoentities 50 at least some of which may be coated in a particular first binding member which is complimentary to a particular second binding member of at least one of the analytes 55 contained within the initial sample receiving chamber 103. Further one or more of the other nanoentities 50' may be coated in a different first member of a binding couple which is complimentary to a particular second binding member of one or more different analytes 55' contained within the sample.

The initial sample receiving chamber 103 and injection chamber 104 are fluidically coupled to one another by a mixing chamber 105 where the nanoentities 50, 50' may be mixed with the sample received from the initial sample receiving chamber 103. Preferably the mixing chamber 105 is further fluidically coupled to a separation chamber 106 which is configured to separate the one or more analytes 55 contained within the sample, as for example the analytes 55 may comprise different types of biological material as described previously, for example the analytes 55 may comprise bacteria, proteins, cells and/or viruses. The separation chamber 106 may comprise a centrifuge or a filter such that the analytes 55 may be separated from the sample by mass or size respectively. Where the analytes 55 are to be separated by size using a filter, a series of filters with decreasing pore size may be used to separate out the analytes 55 of interest from the biological sample. The plurality of analytes 55 can be separated from the sample mixed with the nanoentities received from the mixing chamber, wherein the separation chamber 105 may be fluidically coupled to the biochip 101 by one or more microfluidic flow channels 107. The microfluidic flow channels fluidically couple the separation chamber 105 to the sample chamber of the analyzing system 30. Ideally the number of microfluidic flow channels 107 may correspond to the number of analytes 55, 55' to be separated from the sample or vice versa, wherein a channel 107 may be provided for each specific analyte 55, 55'. To this end different regions 5, 6 of the sensor 10 may be configured to bind with particular analytes 55 contained within the sample. For example different regions 5, 6 may be coated in different first binding members complimentary to different second binding members of the nanoentities 50, 50' which are in turn further coated in different binding members which are complimentary to that of the different analytes such that each region 5 of the nanostructured surface may be complimentary to a specific analyte separated from the sample. More particularly, the nanostructures 16 of the first region 5 may be coated in antibodies that are complementary to the antigen on the surface of the nanoentities 50, which is further coated in an antibody which is complimentary with the antigen of a specific analyte 55.

In an alternative embodiment (not shown) the sample may only contain one nanoentity and accordingly no separation chamber 106 may be required upon the microfluidic chip 100, in this embodiment the mixing chamber 105 may be coupled directly to the biochip 101.

The microfluidic chip 100 may further comprise a suction chamber 108 which is fluidically coupled to the biochip 101, in particular to the sample chamber of the biochip 101. The suction chamber 108 may be fluidically coupled to a waste chamber and/or outlet 109.

The invention is not limited to the embodiment(s) described herein but can be amended or modified without departing from the scope of the present invention.

What is claimed is:

1. An analyzing system comprising:
   a fluid container defining a sample chamber, a sample being contained in the sample chamber;
   a sensor comprising a transparent body with a reverse face and an obverse face, the obverse face having a nanostructured surface, the nanostructured surface comprising a plurality of elongate nanostructures having a respective longitudinal axis that is disposed substantially perpendicularly to the obverse face;
   an excitation and detection apparatus comprising an excitation source for generating a beam of polarized radiation and a corresponding radiation detector, the sensor being coupled to the fluid container such that the nanostructured surface is exposed to the sample chamber and to the sample located therein; and
   wherein the excitation and detection apparatus is configured to direct a beam of incident polarized electromagnetic radiation onto the reverse face of the body at an angle that causes no or substantially no reflection of the polarized radiation from the reverse face, and
   wherein said excitation and detection apparatus being configured to direct to said detector a beam of reflected radiation, said beam of reflected radiation comprising said incident radiation emerging in use from the reverse face after reflection from said nanostructured surface;
   the nanostructures being spaced apart from one another by a distance less than a wavelength of the excitation radiation to cause, in use, plasmonic oscillations in a direction that is normal to said obverse face;
   wherein the nanostructures are functionalized such that a plurality of nanoentities contained within the sample are operable to bind to at least the lateral surfaces of the nanostructures in-use;
   wherein the nanoentities are formed from a metallic material;
   wherein the nanostructured surface comprises a plurality of spaced apart regions;
   wherein at least a first region of the nanostructured surface is functionalized with a first member of a primary binding couple having an affinity for a second member of the primary binding couple which is functionalized upon at least some of the nanoentities; and
   wherein at least a second region of the nanostructures is functionalized with a first member of a tertiary binding couple having an affinity for a second member of the tertiary binding couple which is coated upon some of the nanoentities.

2. The analyzing system of claim 1, wherein when the nanoentities are bound to both the nanostructures and the analyte simultaneously, the analyte being immobilized upon the nanostructured surface.

3. The analyzing system of claim 1, wherein the nanoentities are further functionalized with a first member of a secondary binding couple having an affinity for a second member of the secondary binding couple which comprises at least one of the analytes contained within the sample.

4. The analyzing system of claim 3, wherein the analyte is functionalized with the second member of the secondary binding couple.

5. The analyzing system of claim 4, wherein the nanoentities which are functionalized with the second member of the tertiary binding couple are further functionalized with a first member of a quaternary binding couple which has an affinity for a second member of the quaternary binding couple which comprises at least one of the analytes contained within the sample.

6. The analyzing system of claim 5, wherein the analyte is functionalized with the second member of the quaternary binding couple.

7. The analyzing system of claim 5, wherein at least one of:
   at least one of the primary binding couple, the secondary binding couple, the tertiary binding couple, and the quaternary binding couple comprises a receptor-ligand binding couple;
   the first member of at least one of the primary binding couple and the tertiary binding couple comprises an antibody and the second member of the primary binding couple comprises a complementary antigen; and
   the first member of at least one of the secondary binding couple and the quaternary binding couple comprises an antibody and the second member comprises a complementary antigen.

8. The analyzing system of claim 1, wherein one of:
   the analyte comprises a pathogen and the pathogen comprises a virus, bacterium or fungus; and
   the analyte comprises extracellular secreted proteins, human biomarkers, immunoglobulin or human cells.

9. The analyzing system of claim 1, wherein the nanoentities are spherical in shape.

10. The analyzing system of claim 1, wherein at least one of the nanostructures, nanoentities and analyte are functionalized by being coated with the respective binding member or members.

11. The analyzing system of claim 1, wherein at least one of:
- each of the plurality of regions are connected to a respective electrical terminal; and
- respective different electrical bias are applied to each of the regions by respective power supplies coupled to the electrical terminals.

12. The analyzing system of claim 1, wherein at least one of:
- the respective nanostructures of each region are configured to resonate when illuminated by radiation at respective different wavelengths; and
- the respective nanostructures of each region are configured to resonate at a respective wavelength that corresponds to a respective wavelength of the radiation produced by said excitation source.

13. The analyzing system of claim 12, wherein said excitation source is configured to produce radiation at more than one wavelength; and
- said nanostructured surface includes at least one of said nanostructured region for each of said wavelengths in which the respective nanostructures are configured to resonate when illuminated by the radiation at the respective wavelength.

14. The analyzing system of claim 1, further comprising a microfluidic chip including a biochip.

15. The analyzing system of claim 14, further comprising at least one of:
- an initial sample receiving chamber which is configured to receive the sample containing the one or more analyte;
- an injection chamber which contains the plurality of nanoentities, which is configured to inject the nanoentities into the sample; and
- the sample receiving chamber and injection chamber are fluidly coupled to a mixing chamber, the sample being mixed with the nanoentities.

16. The analyzing system of claim 15, wherein at least one of:
- the mixing chamber is coupled to a separation chamber which is configured to separate the one or more analytes contained within the sample;
- the separation chamber comprises a centrifuge or filter;
- the separation chamber is fluidically coupled to the biochip by one or more microfluidic flow channels; and
- different regions of the sensor are configured to bind with particular analytes contained within the sample.

17. A method of analyzing a sample using the analyzing system of claim 1, the method comprising:
- exposing the nanostructured surface to the sample comprising a plurality of nanoentities and an analyte, wherein the nanoentities are formed from a metallic material;
- causing the nanoentities to bind with the nanostructures and the analyte, wherein the nanostructures are functionalized such that the nanoentities are operable to bind to at least the lateral surfaces of the nanostructures;
- directing a beam of incident polarized electromagnetic radiation onto the reverse face of the body at an angle that causes no or substantially no reflection of the polarized radiation from the reverse face;
- directing to a detector a beam of reflected radiation, said beam of reflected radiation comprising said incident radiation that emerges from the reverse face after reflection from said nanostructured surface; and
- wherein the nanostructured surface comprises the plurality of spaced apart regions;
- wherein at least the first region of the nanostructured surface is functionalized with the first member of the primary binding couple having an affinity for the second member of the primary binding couple which is functionalized upon at least some of the nanoentities; and
- wherein at least the second region of the nanostructures is functionalized with the first member of the tertiary binding couple having an affinity for the second member of the tertiary binding couple which is coated upon some of the nanoentities.

* * * * *